May 19, 1959
J. W. HILL
2,886,816
APPARATUS FOR SEALING CONTAINERS
Filed Aug. 6, 1953
8 Sheets-Sheet 1
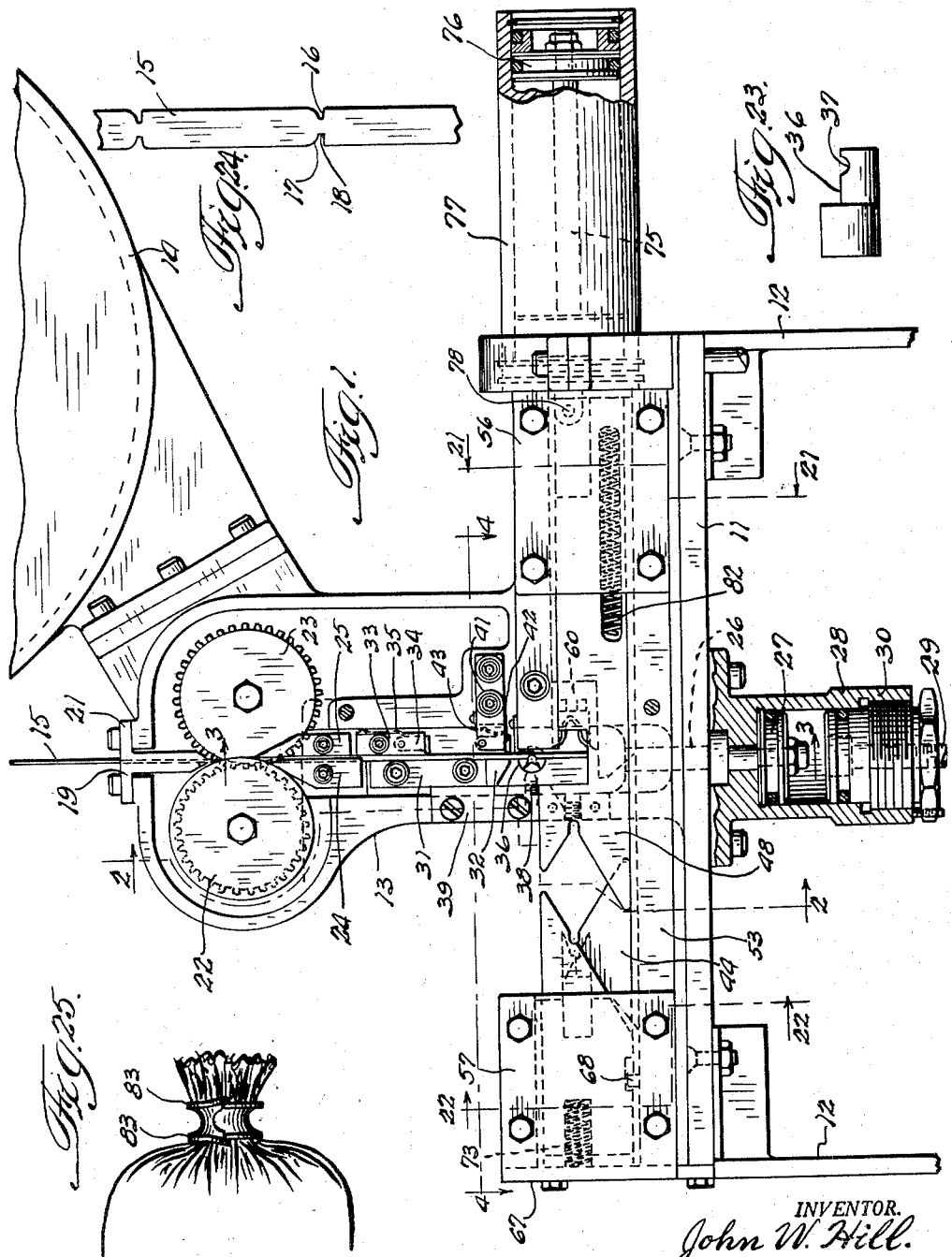
INVENTOR.
John W. Hill.

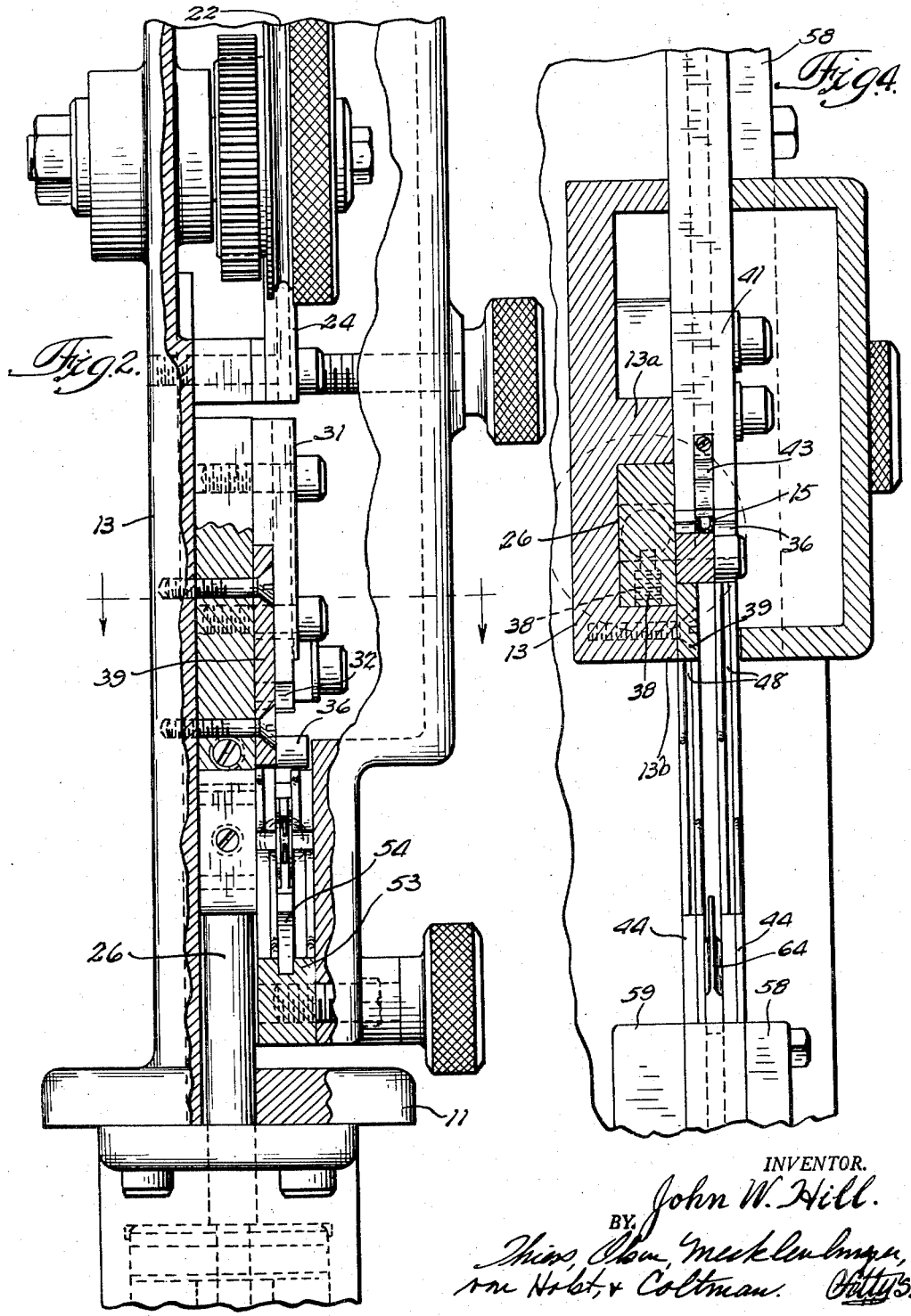

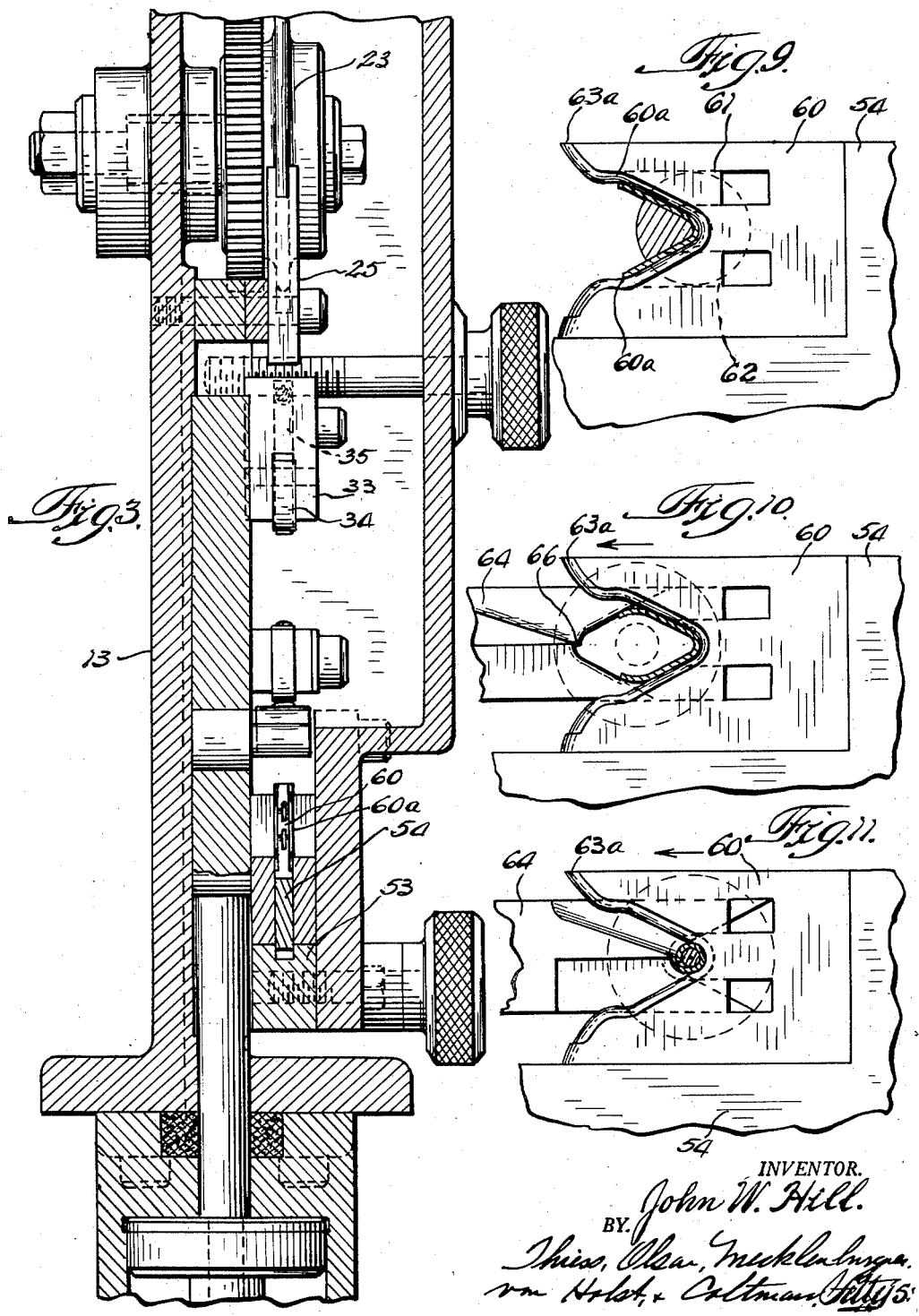

May 19, 1959 J. W. HILL 2,886,816
APPARATUS FOR SEALING CONTAINERS
Filed Aug. 6, 1953 8 Sheets-Sheet 4
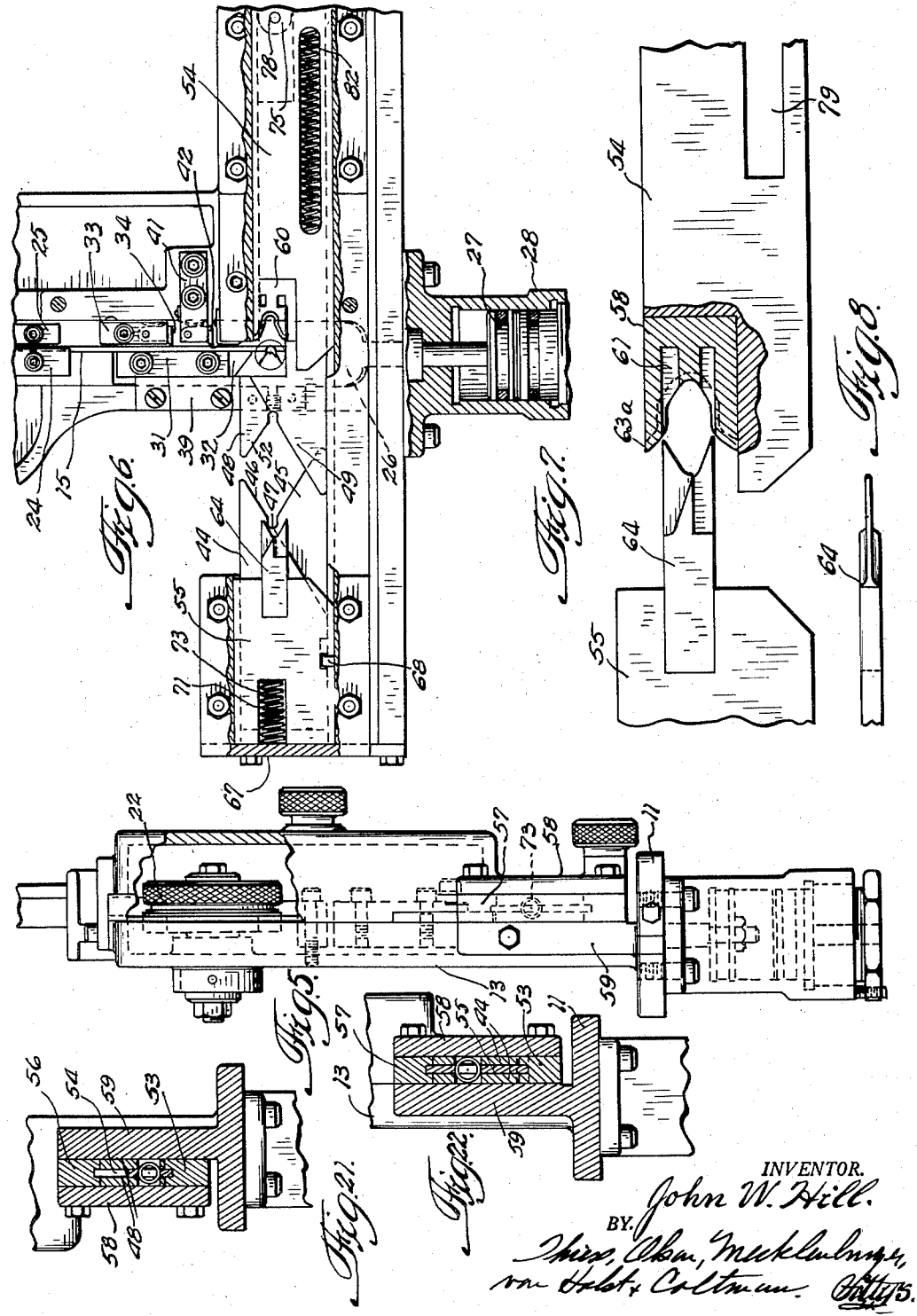
INVENTOR.
John W. Hill.

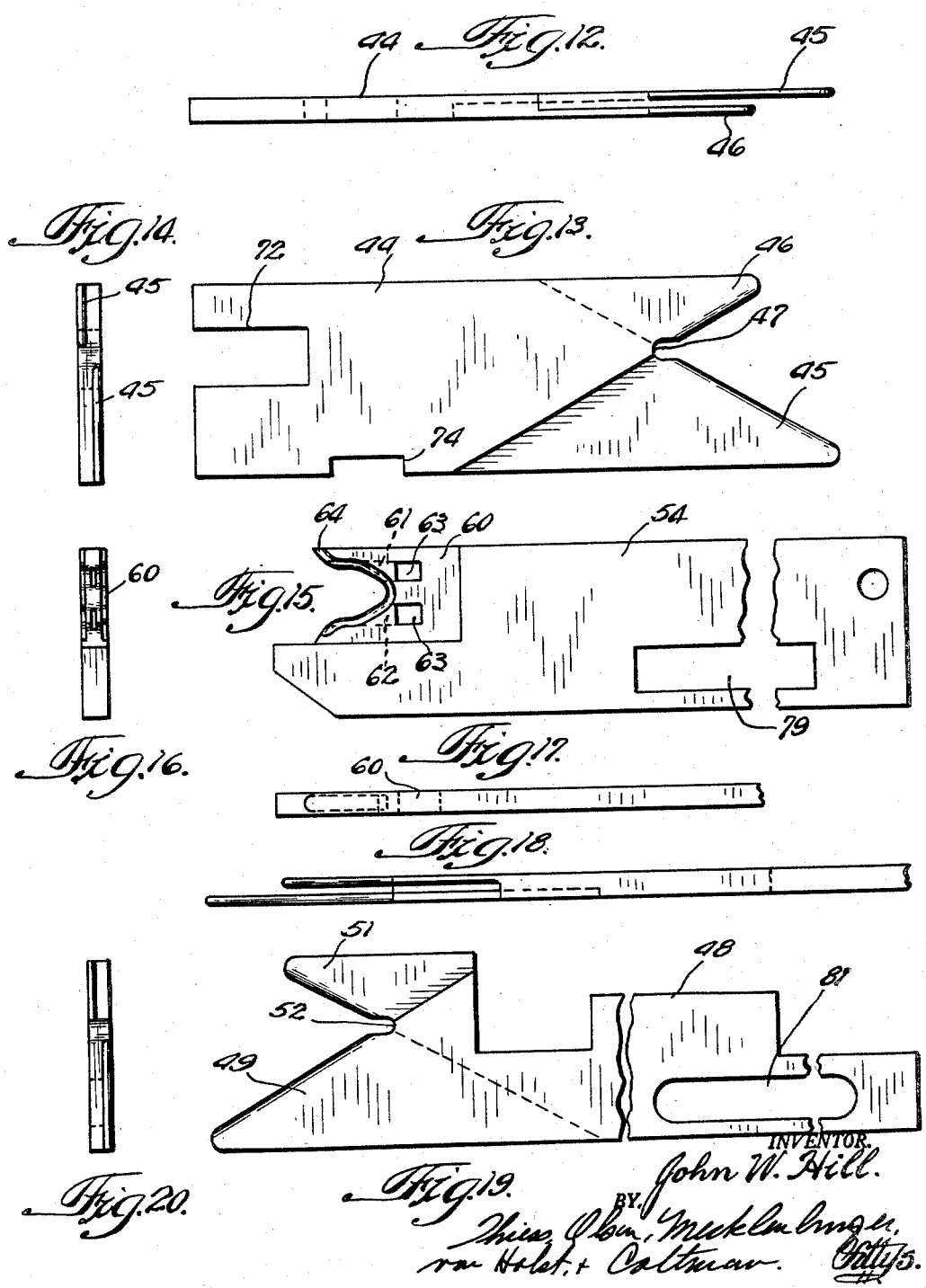

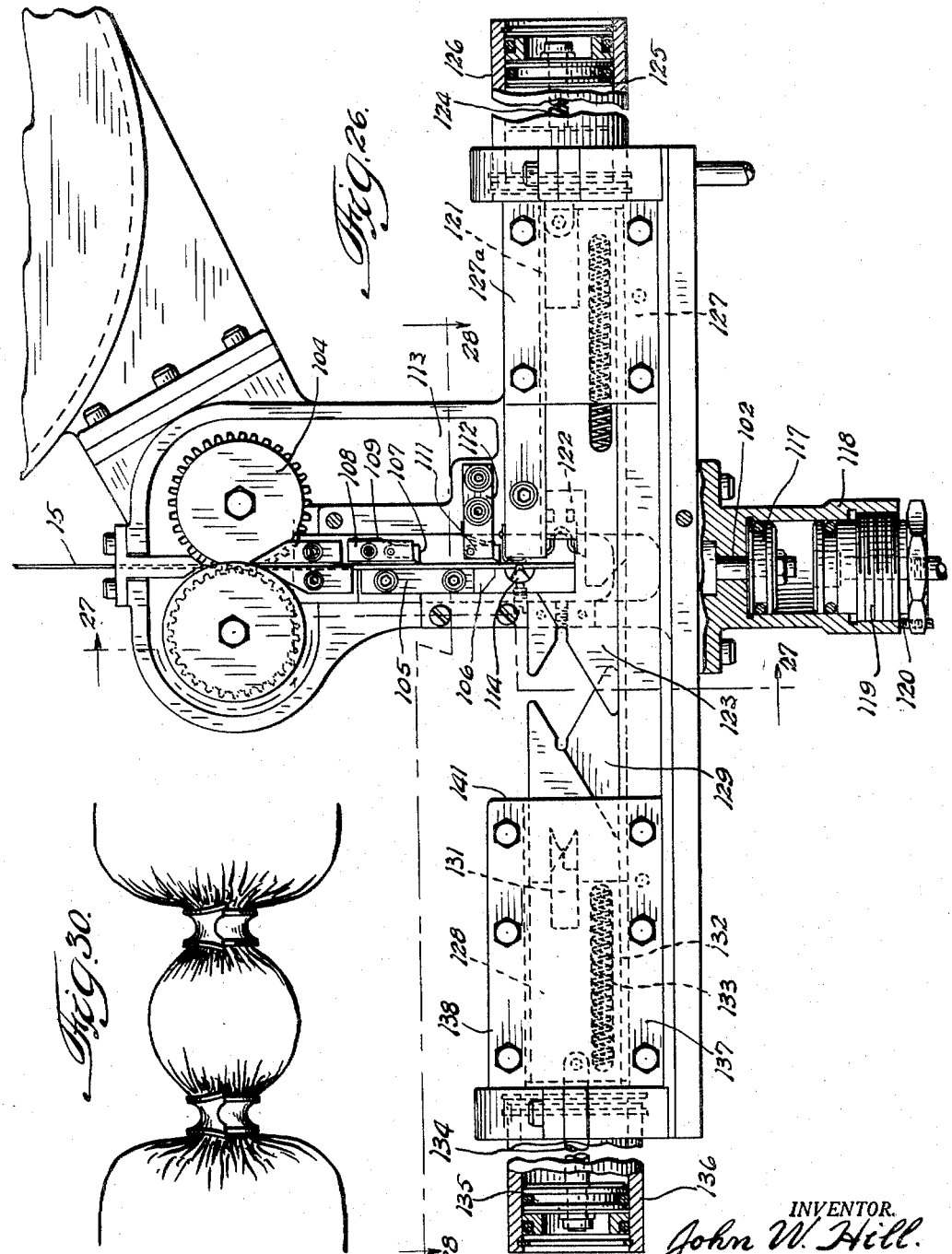

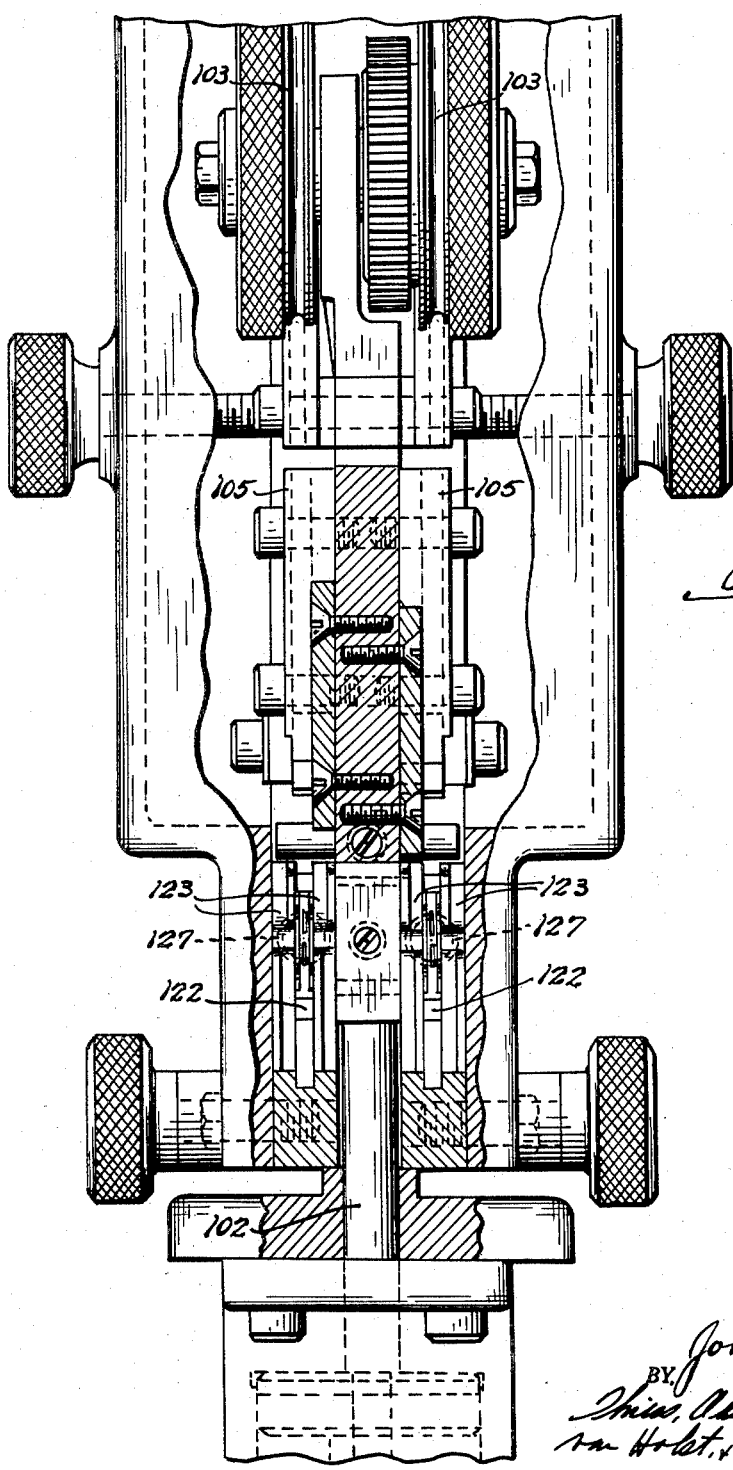

May 19, 1959 J. W. HILL 2,886,816
APPARATUS FOR SEALING CONTAINERS
Filed Aug. 6, 1953 8 Sheets-Sheet 8
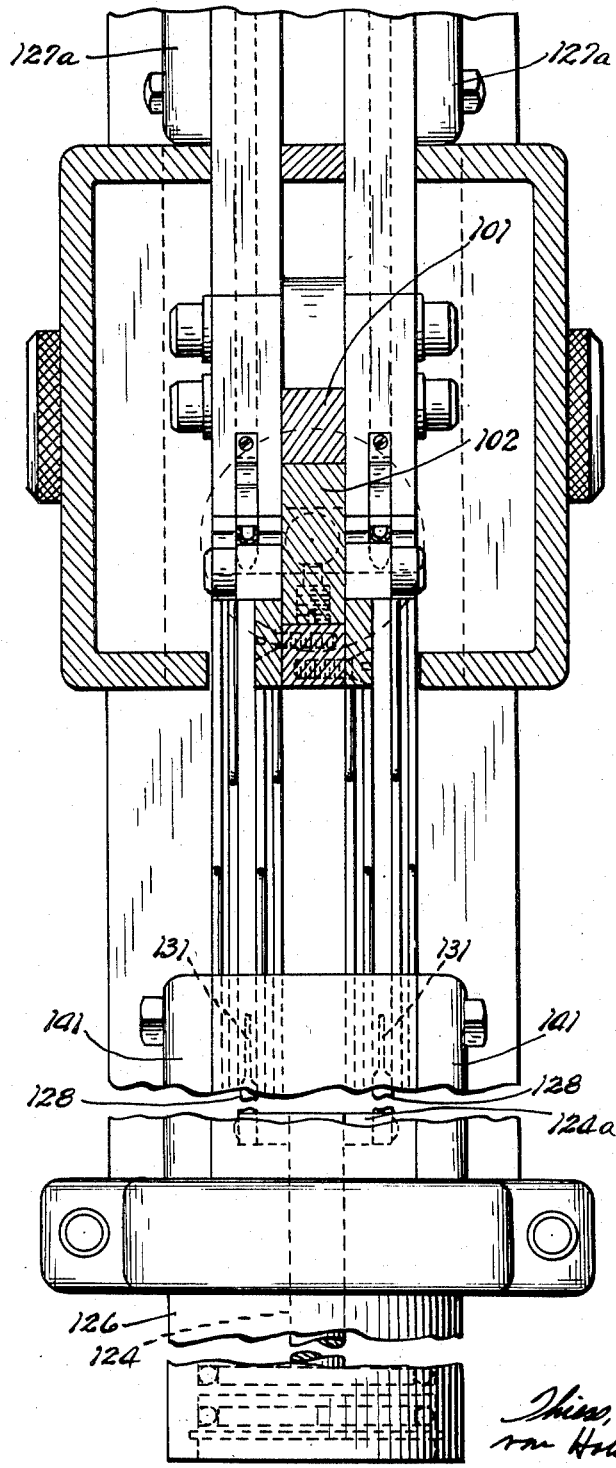
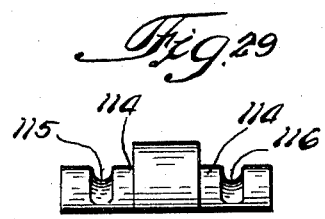
INVENTOR
John W. Hill United States Patent Office 2,886,816
Patented May 19, 1959

2,886,816

APPARATUS FOR SEALING CONTAINERS

John W. Hill, Chicago, Ill., assignor to The Globe Company, Chicago, Ill., a corporation of Illinois Application August 6, 1953, Serial No. 372,701

17 Claims. (Cl. 1—177)

The present invention relates to closing and sealing the flexible ends of containers, such as casings, bags, cartons, etc. More particularly this invention relates to an apparatus for closing containers by means of clips.

The present invention is particularly suitable for closing the ends of tubular casings, such as those employed for sausage meats, and other moldable or plastic materials, although it has wide application and may be used to close flexible portions of a variety of containers.

It is customary to fill long casings, either of the animal or artificial type, and then divide them into individual articles, or else to take and fill inrividual casings of predetermined length. In either case it is necessary to close the ends of the casings of the individual articles. This is accomplished in the present invention by clips of suitable material.

The apparatus of the present invention receives a continuous strip of clip material, shapes the strip so that it is substantially U-shaped in cross section and cuts off a proper length of material to form a clip blank. Thereafter the portion of the casing that is to receive the clip is gathered together and the clip is then forced tightly about the gathered casing with the closed side of the U-shaped clip adjacent the casing and the spaced sides extending outwardly. The machine may be entirely automatic and apply clips to a continuous length of casing filled automatically by a filling or stuffing machine. However, the present machine may be semi-automatic, in which case it is actuated by the operator when desired to place the clip about the casing.

An object of the present invention is to provide automatic and semi-automatic machines for forming the clip blanks and properly securing the clips in place to close the containers.

Further objects and advantages will be apparent from the following description and claims when considered with the accompanying drawings, in which:

Fig. 1 is a front elevational view partially in section of a single acting clipping machine embodying the present invention with the front cover plate removed therefrom;

Fig. 2 is a vertical cross-sectional view partially in elevation taken on the line 2—2 of Fig. 1, but including the front cover;

Fig. 3 is a vertical cross-sectional view taken on the line 3—3 of Fig. 1, but including the front cover;

Fig. 4 is a horizontal cross-sectional view taken on the line 4—4 of Fig. 1, but including the front cover;

Fig. 5 is an end elevational view of the machine shown in Fig. 1, but including the front cover;

Fig. 6 is a front elevational view of a portion of the machine shown in Fig. 1 with certain parts thereof in changed position;

Fig. 7 is a side elevational view partially in section, of the male and female forming tools mounted in their respective tool holders;

Fig. 8 is a top plan view of the male forming tool and holder shown in Fig. 7;

Fig. 9 is an enlarged side elevational view of the female forming tool initially shaping the clip blank about the forming pin;

Fig. 10 is a side elevational view of the male and female forming tools shown in Fig. 7, cooperating to further bend the blank about a flexible casing portion;

Fig. 11 is a view similar to Fig. 10 showing the forming tools at the completion of the forming operation with the clip tightly looped about a flexible casing portion to close it;

Fig. 12 is a top plan view of a gathering or iris member employed in the present invention;

Fig. 13 is a side elevational view of the iris member shown in Fig. 12;

Fig. 14 is an end elevational view of the operating end of the iris member shown in Figs. 12 and 13;

Fig. 15 is a side elevational view of the female forming tool mounted in its slide or carrier;

Fig. 16 is an end elevational view of the tool and carrier shown in Fig. 15;

Fig. 17 is a top plan view of the tool and carrier shown in Figs. 15 and 16;

Fig. 18 is a top plan view of a gathering or iris member for cooperating with that shown in Figs. 12–14;

Fig. 19 is a side elevational view of the iris member shown in Fig. 18;

Fig. 20 is an end elevational view of the iris member shown in Figs. 18 and 19;

Fig. 21 is a vertical cross-sectional view taken on the line 21—21 of Fig. 1;

Fig. 22 is a vertical cross-sectional view taken on the line 22—22 of Fig. 1;

Fig. 23 is a side elevational view of the initial forming pin employed in the single-acting machine of Figs. 1–22;

Fig. 24 is a view of the strip of clip material from which the clips are formed;

Fig. 25 is a view of a flexible container with a clip secured thereon by the clipping machine of Figs. 1–23;

Fig. 26 is a side elevational view partially in section of a double-acting clipping machine for simultaneously applying two clips to a flexible container, with the front cover plate removed;

Fig. 27 is a cross-sectional view partially in elevation taken on the line 27—27 of Fig. 26, but including the front and rear covers;

Fig. 28 is a transverse cross-sectional view taken on the line 28—28 of Fig. 26, but including the front and rear covers;

Fig. 29 is a side elevational view of the initial forming pin employed in the clipping machine shown in Figs. 26–28; and Fig. 30 is a side elevational view of a portion of flexible casing with the two clips secured thereon in spaced relation by the double-acting clipping machine of Figs. 26–28.

Referring to the drawings and more particularly to Figs. 1–23, there is shown a single-acting clipping machine for forming clip blanks and then securing them in place about a flexible casing for the purpose of closing and sealing it. The single-acting machine is preferably of a semi-automatic type being so arranged that when actuated by the operator, it will go through one complete cycle which may consist of forming the clip blank, initially bending it, crimping or gathering the flexible casing portion to be closed, and tightly securing the clip about the gathered casing portion to seal it. The machine may be employed for closing and sealing one end of an empty casing portion and also for closing and sealing the open end of a filled casing.

The single-acting machine may comprise a base 11 mounted on suitable supports such as the legs 12. Extending upwardly from the base 11 is a rear supporting plate 13 upon which various of the parts of the machine are mounted. It also serves as a rear cover plate.

A holder 14 for a roll of suitable strip material from which the clips are formed is secured on the supporting plate 13. While any suitable material may be employed for the clips, metal, particularly aluminum, has been found preferable due to its strength, ductility and workability. Aluminum strips 3/16 of an inch wide and 0.025 inch thick have proven very satisfactory. The strip or blank, illustrated in Fig. 24, is preferably provided with pairs of opposed notches extending inwardly from opposite sides of the flat clip material. The notches are spaced apart a distance equal to the length of the clip. The lower edges of the notches extend substantially at right angles to the length of the strip as shown at 16, although the outer corners are preferably slightly rounded. The upper sides of the notch defining the lower end of a clip blank are rounded as shown at 17 and the upper and lower notch edges are connected by a narrow neck 18.

The flat material 15 is fed preferably in a continuous strip from the roll mounted in the roll holder 14 into the top of the clipping machine between guide members 19 and 21 to a pair of forming rolls 22 and 23 that impart a channel shape to the strip 15. One of the rolls 22 has its periphery grooved and the cooperating roll 23 is beaded at the periphery to fit into the groove in the roll 22. The rolls are suitably mounted on the rear supporting plate 13 and have intermeshing gears associated therewith. After passing through the forming rolls 22 and 23 the strip is substantially U-shaped in transverse section with the closed side rounded and the two opposed sides extending outwardly therefrom in spaced substantially parallel relation.

From the rolls 22 and 23, the strip passes downwardly between a pair of guides 24 and 25 fixedly mounted on the rear supporting plate 13. The inner face of the guide 24 is grooved to provide a channel for the closed side of the channel-shaped strip, while the opposed face of the guide 25 is flat for engaging the outwardly extending opposed sides of the blank and holding it in the groove in the guide 24.

The feed of the strip 15 is provided by suitable mechanism mounted on a pull-down shaft 26 vertically movable in the base 11. The lower end of the pull-down shaft 26 is connected to a piston 27 reciprocable in an air cylinder 28 located below the base 11 and provided with air supply lines 29 at its opposite ends. Suitable valve means control the supply and exhaust of the air to and from the opposite ends of the cylinder 28 to effect reciprocation of the piston 27 and the shaft 26. Movement of the piston may be limited exactly by a plug 30 threaded into the lower end of the cylinder and locked in place by a set screw thereon.

A clip guide 31 is mounted on the upper end of the pull-down shaft by bolts or other suitable means. At the lower end of the clip guide 31 there is a cutoff bar 32. The inner face of the clip guide 31 is provided with a channel for receiving the rounded side of the strip 15 therein. Also mounted at the upper end of the pull-down shaft 23 is a latch holder or block 33 having a slot in the lower end for a pivotally mounted latch 34 shaped to fit into the notches in the sides of the strip. The latch is urged toward the strip 15 by a leaf spring 35.

Also mounted on the pull-down shaft 26 is a forming pin 36 shown particularly in Fig. 23. The base of the pin 36 fits into an opening provided therefor in the shaft 26 slightly below the cutoff bar 32. A groove 37 of a shape to receive the closed side of the U-shaped strip 15 is formed in one side of the pin 36. A set screw 38 may be provided to maintain the forming pin in proper position. The piston 27 and pull-down shaft 26 are arranged to move the length of one clip blank from their lower to upper position. When the shaft 26 moves, the clip guide 31, latch 34, latch block 33, cutoff bar 32 and forming pin 36, all move as a unit.

In the upper position of the pull-down shaft shown in Fig. 1, the latch 34 is positioned to engage a pair of notches in the U-shaped strip 15. Thereafter downward movement of the shaft 26 moves the strip 15 downwardly a distance equal to the length of a clip blank (Fig. 6) and positions the lower end of the strip 15 in position to have one clip blank severed from the lower end thereof by a suitable cutoff member or knife which cooperates with the cutoff bar 32 when the latter is in its lower position.

The rear supporting plate 13 is provided with parallel, forwardly extending ribs 13a and 13b which together with the plate 13 form a guide or channel in which the pull-down shaft 26 slides (Fig. 4). Removal of the shaft from its channel is prevented by a guide plate 39 detachably secured to the front of the rib 13b.

Latch means are also provided for maintaining the strip 15 stationary while the shaft 26 is moved from its lower to upper position. A block 41 is secured to the rear supporting plate 13 and the forward end thereof is bifurcated forming a central slot. Mounted in this slot about a pivot at its upper end, is a latch 42 which is urged forward toward the channel-shaped strip 15 by a spring 43. The latch 42 is shaped to engage the notches in the opposite sides of the strip 15 and prevent upward movement thereof, but is rounded on its top to permit the strip to be moved downwardly while the latch 42 is moved rearwardly against the action of the spring 43. The latch 43 is so located that when the latch 34 carried by the pull-down shaft 26 is in its upper position the distance from the latch 34 to the latch 42 is twice the length of the individual clip blanks which are severed from the end of the strip. The above mechanism also acts as indexing means to locate accurately the strip so that a blank of exactly the proper length will be severed from the lower end thereof.

While the machine embodying the present invention may be used for closing and sealing various types of flexible casings, or containers having flexible portions, it is particularly suited for use in connection with tubular casings of the general type heretofore used for sausage meats and the like. Some of these casings are secured from animals, while others are made artificially from plastics and other suitable materials.

In the present machine two sets of gathering or iris members of the type shown in Figs. 12–14 and 18–20, are preferably employed for gathering the casing on each side of the portion that is to receive a clip. Each member of a cooperating pair preferably comprises a slide having a pair of diverging jaws at the inner end thereof, transversely offset from each other forming a diverging opening as viewed in side elevation. Referring to Figs. the slide 44 is provided with a relatively large, downwardly tapering jaw 45 and an upper tapering smaller jaw 46 laterally offset therefrom. A rounded opening 47 is provided between the jaws 45 and 46.

The other cooperating gathering or iris member 48 is provided with a relatively large downwardly tapering jaw 49 and a smaller upwardly tapering jaw 51 offset therefrom as shown in Figs. 18–20. A rounded groove 52 is provided adjacent the intersection of the two jaws. When the two iris members 44 and 48 are arranged with their inner ends facing each other and are moved toward each other, they cooperate to gather the casing and crowd it into the rounded inner openings 47 and 52 by constantly reducing the area between the jaws of a cooperating pair of gathering members. Referring to Fig. 4, it will be seen that when the spaced pairs of cooperating iris members 44 and 48 are moved toward each other, a flexible casing portion positioned therebetween will be compressed at two spaced places. The space between the two pairs of gathering members is preferably substantially equal to the width of a channel-shaped clip blank.

The clip forming and applying members will now be described. A pair of cooperating slides may be provided for carrying the tools employed in shaping and affixing the clip to the casing or other container. One of the slides is preferably positioned between the two spaced crimping members at each side of the material to be closed. A guide member 53 is secured to the lower portion of the rear supporting plate 13 and extends horizontally the full length of the machine. It is provided with a central longitudinal groove of a width to receive therein the tool holders 54 and 55, shown particularly in Figs. 6–11 and 15–17. The tool holder 54 carries the female tool (Figs. 15–17), and the tool holder for the male tool is shown most clearly in Figs. 6–8. Top guide members 56 and 57 provided at the opposite ends of the device for guiding the upper sides of the crimping members and tool holders, have central longitudinal grooves in their lower faces in which the upper edges of the tool holders 54 and 55 slide. The iris members on each side thereof are narrower from top to bottom than the tool holders and ride on the opposed faces of the top and bottom guide members. Front guide plates 58 are secured to the end frame portions 59 of the machine and maintain the iris members 44 and 48 therebetween.

The tool holder 54 is provided with a cutout portion in its upper forward corner in which is secured the female forming tool 60. This tool is provided with a diverging substantially V-shaped opening at its forward or inner end with the portions 60a adjacent thereto cut out to receive therein the opposed flanges of the channel-shaped strip 15, as shown in Figs. 4 and 9–11, so that when associated with the female forming tool the flanges of the clip blank will not project outwardly beyond the sides of said tool. Extended rearwardly from the forward or inner end of the female tool 60 is a pair of spaced slots 61 and 62, which are provided with openings 63 communicating with the outer surface of the tool, thus preventing any foreign material from collecting in the slots 61 and 62, and preventing the entry of the male forming tool intended to be received therein. The upper forward edge of the female forming tool is provided with a knife edge 63a for cooperating with the lower surface of the cutting bar 32 to sever clip blanks from the strip 15.

The male forming tool 64 is secured at the inner or forward end of the tool carrier slide 55. It is also V-shaped at its inner end and is sufficiently narrow from top to bottom to slide into the slots 61 and 62 in the female forming tool, as illustrated in Figs. 7–11. One of the jaw portions of the male forming tools preferably extends rearwardly of the other forming a ledge or projection 66, of sufficient width to permit one end of the clip to engage it and be held against rotation while the clip is being forced about the casing.

The tool forming holder 54 at the left-hand side of the machine as viewed in Figs. 1 and 6, may abut the end plate 67. It is also provided with a slot in the bottom thereof for closely fitting about a transverse stop member 68. Thus, in the form of device shown in Figs. 1–23, the tool holder for the male forming tool is prevented from movement. This tool holder 54 is provided with a slot 71 in the rear side thereof and the gathering or iris members 44 on each side thereof are provided with similarly situated slots 72. A coil spring 73, shown particularly in Figs. 6, 21 and 22 is positioned in said slots 71 and 72. The iris members 44 are also provided in the bottom thereof with a cutout portion 74 for fitting over the transverse stop member 68 and permitting limited movement of the crimping members. The spring 73 normally maintains the members 44 in their forward position spaced a slight distance from the rear plate 67. However, when pressure is applied to the inner ends of the members 44, they can be moved rearwardly against the action of the spring 73 until they engage the rear plate 67. Forward movement of the gathering members 44 is limited by the transverse stop bar 68.

The tool holder member 54 and the gathering or iris members 48 on each side thereof are moved forwardly from their retracted position shown in Fig. 1, until the iris members compress the casing therebetween, and the forming tools 58 and 64 are brought together in overlapping relation as shown in Fig. 11. Tool holding member 54 is connected to the piston rod 75 of a piston 76 reciprocable in a cylinder 77. Suitable air supply means are connected to the opposite ends of the cylinder 77 for effecting reciprocation of the piston therein. Any suitable means such as a pin or bolt 78 may be employed for connecting the piston rod 75 to the tool holder 54.

The tool holder 54 is provided with a longitudinal slot 79 and the crimping members 48 on each side thereof are provided with central slots 81 for receiving therein a coil spring 82. Although only the tool holding member 54 is shown as being connected to the piston rod 75, when the tool holder 54 is moved forwardly by movement of the piston 76, the iris members 48 are carried forwardly therewith by the spring 82. However, after the iris members 44 and 48 are moved together to compress the casing therebetween, they remain in this position while the tool carrying member 54 moves forwardly and the female forming tool reaches the overlapping position with respect to the male forming tool shown in Fig. 11, at which time the clip is tightly forced about the casing.

In the operation of the clipping machine shown in Figs. 1–23, the various parts operate in controlled sequence. With the machine in the position shown in Fig. 1, air is admitted to the cylinder 28 to force the piston 27 and the pull-down shaft 26 downwardly to their lower positions. As the rod 26 moves downwardly the latch 34 carried thereby pulls the strip 15 downwardly a distance equal to the length of one clip blank and the forming pin 36 likewise moves downwardly until the parts are in the position shown in Fig. 6. Air is then supplied to the rear end of cylinder 77 to force the piston 76 inwardly, thus moving the tool carrier 54 inwardly. Upon inward movement of the female forming tool 58, the knife edge 63a at the top thereof cooperates with the cutting bar 32, then in its lower position, to sever the portion of the channel-shaped strip 15 extending therebelow, which is one clip length. Further movement of the forming tool 58 bends the clip about the forming pin 36 into substantially a V-shape. The closed side of the channel-shaped clip lies in the groove 37 of the forming pin 36 so that the clip blank is bent to bring the outer ends of the closed side of the clip toward each other in the position shown in Fig. 9.

After this initial forming operation, air is directed to the opposite side of the piston 76 to move it rearwardly a slight distance to withdraw the tool 58 and the clip thereon away from the forming pin 36. At this point air is admitted to the lower end of the cylinder 28 and raises the pull-down shaft 26 upwardly carrying the forming pin out of the way. When this has occurred, air is again supplied to the outer end of cylinder 77 to move the piston rod and the tool carrying member 54 inwardly again. As the tool carrying member 54 moves inwardly the irises 48 on each side thereof are carried inwardly by the spring 82 until they overlap and crimp the casing in the grooves 47 and 52. This will also move the crimping members 44 against the end plate 67 against the action of the spring 73. With the casing crimped by the crimping members 44 and 48, the female forming tool and clip blanks are carried forward by further movement of the tool carrier 54, until the clip is forced tightly about the crimped portion of the casing, as shown in Fig. 11. As the lower end of the clip will abut the ledge 66, closing of the tool forming members will result in the upper portion of the clip being looped tightly about the casing and beneath the lower end of the clip substantially as illustrated in Fig. 25.

The shape of the present clip is very advantageous, as it results in a clip that not only is very strong, but one which will not injure the casing or any other articles it comes into contact with in any way. Due to the rounded shoulders 17 of the blank, the exposed edges 83 of the applied clip are round and free of any sharp edges or corners, and with the closed side of the channel-shaped clip adjacent the casing, there is no likelihood of injuring either the casing upon which the clip is secured or anything else coming into contact with the clip. Also the outwardly extending opposed sides of the clip act as reinforcing ribs and result in a clip of great strength that will remain tight despite rough handling of the article upon which it is secured. This permits the use of a relatively light aluminum strip having a thickness of less than 0.02 inch for many purposes. Even with such light material the resulting seal may be made gas and liquid tight so that food products may be kept therein for indefinite periods of time without any likelihood of spoiling.

A fully automatic double-acting clipping machine for applying pairs of spaced clips simultaneously is disclosed in Figs. 26–29. This machine is intended for use with automatic machines that continuously fill endless lengths of casing with measured amounts of material. The double-acting fully automatic machine is preferably synchronized with the filling machine and simultaneously closes off the end of a filled casing portion and also the end of an unfilled casing portion which is then ready to receive a charge from the metering and filling machine. With such machines it is possible to continuously fill endless lengths of casing with metered charges of material, seal the casing with pairs of spaced clips between each of the charges, and then sever the clipped casing between the pairs of adjacent clips to form the completed individual articles.

The construction of the fully automatic double-acting machine is substantially the same as the single-acting machine except that many parts or groups of parts, such as the iris members and forming tools, are duplicated and arranged side-by-side as shown in Fig. 27. In this form of machine there is a central supporting structure 101 in which the pull-down shaft 102 reciprocates (Fig. 28). Only a single pull-down shaft is required as the various parts carried thereby are arranged on opposite sides thereof instead of only on one side as in the single-acting machine.

A pair of cooperating shaping rolls is rotatably mounted on each side of the supporting structure. Each pair includes a roll 103 having a peripheral groove and a cooperating roll 104 having a peripheral bead thereon for giving a channel shape to the strips 15 previously described herein. On each side of the pull-down shaft 102 there is a clip guide member 105 having a groove on its inner face for receiving the rounded closed side of the channel-shaped strip 15. At the lower end of each of the strip guides 105 there is a cutoff bar 106. Also mounted on opposite sides of the shaft 102 are latches 107 mounted in blocks 108 and held against the strips 15 by springs 109. Positioning latches 111 mounted on stationary blocks 112 and also held against the strips 15 by springs 113 hold the channel-shaped strips stationary while the shaft and latches 107 are being moved from lower to upper position. Also carried on each side of the shaft 102 are forming pins 114 shown particularly in Fig. 29. The pins 114 have slots 115 in one side thereof similar to the pin 36 for receiving the rounded sides of the channel-shaped strips 15.

The shaft 102 is reciprocated by a piston 117 in a cylinder 118. As in the single acting machine, the length of the stroke of the piston 117 is controlled by the position of the plug 119 held in desired position by a set screw 120.

Two spaced substantially parallel tool carriers 121, similar to the tool carrying members 54 and having female forming tools 122 at their inner ends, are arranged at opposite sides of the central supporting structure 101. A gathering member 123 similar to the gathering member 48 is positioned on each side of the tool carrying members 121, thus forming two sets, each of which consists of a tool carrying member with its tool and a gathering member 123 on each side thereof. Both tool carrying members 121 are connected by suitable means to the piston rod 124 of a piston 125 mounted in the air cylinder 126.

A coil spring 127 is positioned in the openings provided therefor in the tool carrier 121 and the gathering members 123, thus tending to move the gathering members with their adjacent tool carrying member. As in the single-acting machine the top and bottom guides for the tool carriers and gathering members are provided with grooves in which the upper and lower edges of the tool carrying members 121 ride while the upper and lower edges of the gathering members on each side thereof engage the opposed faces of the guides on both sides of the grooves. Suitable front and rear cover plates 127a are also provided at the right end of the machine as viewed in Fig. 26.

It is thus to be seen that except for the duplication of various parts or groups of parts, the central and right end portions of the double-acting machine are substantially the same as those in the single-acting machine.

However, the left end of the double-acting machine, as viewed in Fig. 26, is constructed to provide the reciprocation of the tool carrying members and the gathering or iris members 129 adjacent thereto. Two spaced, substantially parallel tool carrying members 128 are arranged for cooperating with the tool carrying members 121. Mounted in the inner ends of the tool carriers 128 there are male forming tools 131 which are substantially the same as the male forming tools 64. Coil springs 132 are arranged in similar openings 133 provided therefor in the tool carriers 128 and the iris members 129 on each side of the tool carriers for moving each group as a unit.

The tool carrier 128 is connected at its outer end to the piston rod 134 of a piston 135 in an air cylinder 136. Suitable conduits are provided for the supply of air to and the exhaust of air from the opposite sides of the piston 135.

A bottom guide member 137 extending the length of the machine is provided with spaced grooves in the bottom thereof in which the lower edges of the tool carrying members 128 and 121 ride at opposite ends of the machine. An upper guide member 138 positioned above the tool carrying members 128 also has grooves therein in which the upper edges of the tool memebrs 128 ride. The iris members 129 on each side of the tool carriers 128 engage the opposed faces of the guide members 137 and 138 adjacent the grooves. Suitable cover plates 141 are also provided adjacent the outer faces of the iris members 129, and serve with the central supporting plate to provide a pasageway for each tool carrier 128 and the adjacent iris member 129.

In the operation of the double-acting machine the piston 117 is first actuated to pull down the shaft 102 from its upper position, shown in Fig. 26, to its lower position with the initial forming pins opposite the female forming tools 122. When the pull-down shaft 102 has reached its lower position the piston 125 is actuated to move the female forming tools 122 inwardly a distance sufficient to sever clip blanks from the lower end of the strips 15 and initially shape the severed blanks until they are substantially V-shaped, as shown in Fig. 9. Piston 125 is then forced outwardly to retract the tools 122 after which the pull-down bar is returned to its upper position. Thereupon pistons 125 and 135 are simultaneously moved inwardly to carry the tools and iris members connected to each inwardly. This continues until the iris members 123 and 129 gather the casing in the rounded openings adjacent the intersection of their jaws. While the iris members remain in this position the forming tools 122 and 131 continue to move inwardly until they cooperate to force the clip blanks in a loop tightly about the casing portion, substantially as illustrated in Figs. 10 and 11. The pistons 125 and 135 are then retracted to their outer position.

The double-acting machine as heretofore pointed out is preferably synchronized with a metering and filling machine, in such manner that as soon as the endless casing has received a charge of material, the clipping machine goes through one complete cycle to secure a pair of spaced clips to the casing. The clipping machine then remains stationary while another charge is supplied to the casing and the casing with the charge therein is moved to a position to receive two more clips at which time the clipping machine is again actuated. With the present single- or double-acting machine, clips formed of relatively light material may be quickly and easily secured to flexible casing portions to seal them off. The clips when in place are sufficiently strong to maintain the closed portion of the casing gas and liquid tight despite rough handling.

While particular embodiments of this invention have been illustrated and described, it will be understood, of course, that the invention is not to be limited thereto, since many modifications may be made, and it is contemplated therefore by the appended claims to cover any such modifications as fall within the true spirit and scope of this invention.

I claim:

1. In a machine for applying susbtantially straight clip blanks substantially U-shaped in transverse section to a flexible portion to be closed, bending mechanism for relatively moving the ends of the closed side of said substantially straight blank a distance towards each other, and shaping means for forcing the closed side of said bent clip blank about the portion to be closed with the opposed sides extending outwardly therefrom and the ends of said clip in superposed position.

2. In a machine for applying clip blanks to a flexible portion to be closed, mechanism for forming a strip of clip material into a channel member substantially U-shaped in transverse section, cutting means for severing a clip blank from said channel member, bending mechanism for relatively moving the ends of the closed side of said clip blank a distance towards each other, and shaping means for forcing the closed side of said blank tightly about the portion to be closed with the opposed sides extending outwardly therefrom.

3. In a machine for applying substantially straight clip blanks substantially U-shaped in transverse section to a flexible portion to be closed, bending mechanism shaped to engage said U-shaped blank operable to relatively move the ends of the closed side of said substantially straight blank distance towards each other, members for gathering the casing portion adjacent the portion to be closed, and shaping means shaped to engage said bent blank for forcing the closed side of said bent clip blank tightly about the portion to be closed with the opposed sides extending outwardly therefrom.

4. In a machine for applying clip blanks substantially U-shaped in cross section to a flexible casing portion to be closed, cooperating forming tools for forcing the closed side of said blank tightly about the casing portion to be closed, said tools having opposed diverging jaw portions of a size and shape to engage the outer surface of said blank between the outwardly extending opposed sides thereof, and means for moving said tools relatively towards each other to force said clip into substantially a closed loop.

5. In a machine for applying clip blanks substantially U-shaped in cross section to a flexible casing portion to be closed, cooperating forming tools for forcing the closed side of said blank tightly about the casing portion to be closed, said tools having opposed diverging jaw portions of a size and shape to engage the outer surface of said blank between the outwardly extending opposed sides thereof, and being movable between a spaced position permitting the insertion therebetween of a casing portion to be closed, and clamping position with the inner jaw portions adjacent each other, and means for forcing said tools from spaced position to clamping position to force said clip tightly about the casing portion between said tools.

6. In a machine for applying clip blanks substantially U-shaped in cross section to a flexible casing portion to be closed, cooperating forming tools for forcing the closed side of said blank tightly about the casing portion to be closed, said tools having opposed diverging jaw portions of a size and shape to engage the outer surface of said blank between the outwardly extending opposed sides thereof, the jaw portion of one of said tools being relatively narrow and the other tool having slots extending inwardly from the end thereof for receiving said narrow jaw portion therein, and means for moving said tools relatively toward each other to force said clip into substantially a closed loop.

7. In a machine for applying clip blanks substantially U-shaped in cross section to a flexible casing portion to be closed, cooperating forming tools for forcing the closed side of said blank tightly about the casing portion to be closed, said tools having opposed diverging jaw portions of a size and shape to engage the outer surface of said blank between the outwardly extending opposed sides thereof, one of said jaw portions having a projection thereon for being abutted by one end of said blank to prevent movement of said end past the projection, and means for moving said tools relatively toward each other to force said clip into substantially a closed loop with the closed side of said blank adjacent said casing portion and the opposed sides extending outwardly.

8. In a machine for applying clip blanks substantially U-shaped in cross section to flexible casing portions to be closed, a shaping member about which said blank may be bent into substantially V-shape with the closed side inwardly, movable into operative position adjacent the closed side of said blank and away therefrom, bending mechanism for bending said clip into substantially V-shape about said shaping member and cooperating forming tools for forcing the closed side of the substantially V-shaped blank tightly about the portion to be closed, said tools having diverging portions of a size and shape to engage the outer surface of said blank between the outwardly extending opposed sides thereof, and means for moving said cooperating forming tools toward and away from each other.

9. In a machine for applying clip blanks substantially U-shaped in cross section to flexible casing portions to be closed, means for feeding said clip blanks, cooperating forming tools positioned on opposite sides of the path of feed of said blanks having diverging jaw portions for shaping said blanks and forcing the closed side thereof about said casing portions, means for moving said tools relatively toward and away from each other, a shaping member movable into and out of operative position in the path of one of said tools and adjacent the closed side of a blank, said shaping member when in operative position acting to engage the outer surface of said blank between the outwardly extending opposed sides and adjacent the ends thereof and bend the blank carried thereagainst by movement of said last tool into substantially a V-shape.

10. In a machine for applying clip blanks substantially U-shaped cross section to flexible casing portions to be closed, reciprocating means for intermittently feeding said blanks, cooperating forming tools positioned on opposite sides of the path of feed of said blanks having diverging jaw portions for shaping said blanks and forcing the closed side thereof about said casing portions, means for moving said tools relatively toward and away from each other, a shaping member associated with said clip feeding means and movable thereby into and out of operative position in the path of one of said tools and adjacent the closed side of one of said blanks, said shaping member when in operative position acting to bend the blank carried thereagainst by movement of said last tool into substantially a V-shape.

11. In a machine for applying clip blanks substantially U-shaped in cross section to a flexible casing portion to be closed, cooperating forming tools movable toward and away from each other for forcing the closed side of said blank tightly about said casing portion, cooperating iris members adjacent opposite sides of said forming tools having diverging jaw portions movable toward and away from each other for gathering the flexible material adjacent the casing portion to receive a clip, said iris members being resiliently connected to said forming tools and movable therewith.

12. In a machine for applying clip blanks substantially U-shaped in cross section to a flexible casing portion to be closed, cooperating forming tools for forcing the closed side of said blank tightly about the casing portion to be closed, said tools having opposed diverging jaw portions of a size and shape to engage the outer surface of said blank between the outwardly extending opposed sides thereof, a pair of cooperating iris members adjacent said forming tools having diverging jaw portions movable relatively toward and away from each other for gathering the flexible material adjacent the casing portion to receive a clip, and means for moving said tools and said iris members relatively toward each other to gather the material and loop said clip tightly thereabout.

13. In a machine for applying clip blanks substantially U-shaped in cross section to a flexible casing portion to be closed, cooperating forming tools for forcing the closed side of said blank tightly about the casing portion to be closed, said tools having opposed diverging jaw portions of a size and shape to engage the outer surface of said blank between the outwardly extending opposed sides thereof, a pair of cooperating iris members adjacent said forming tools having diverging jaw portions movable relatively toward and away from each other for gathering the flexible material adjacent the casing portion to receive a clip, means for moving said tools relatively toward and away from each other and means tending to relatively move said iris members with said tools.

14. In a machine for applying clip blanks substantially U-shaped in cross section to a flexible casing portion to be closed, cooperating forming tools for forcing the closed side of said blank tightly about the casing portion to be closed, said tools having opposed diverging jaw portions of a size and shape to engage the outer surface of said blank between the outwardly extending opposed sides thereof, a pair of cooperating iris members adjacent opposite sides of said forming tools having diverging jaw portions arranged adjacent said tools and movable relatively toward and away from each other for gathering the flexible material adjacent the casing portion to receive a clip, at least one of said iris members normally extending inwardly toward the other beyond the inner end of the adjacent tool, means for moving said tools relatively toward and away from each other, and means tending to relatively move said iris members with said tools.

15. In a machine for applying clip blanks substantially U-shaped in cross section to a flexible casing portion to be closed, cooperating forming tools for forcing the closed side of said blank tightly about the casing portion to be closed, said tools having opposed diverging jaw portions for engaging the outer surface of said blank be- between the outwardly extending opposed sides thereof, a pair of cooperating iris members having diverging jaw portions arranged adjacent said tools and movable relatively toward and away from each other for gathering the flexible material adjacent the casing portion to receive a clip, at least one of said iris members normally extending inwardly toward the other beyond the inner end of the adjacent tool, resilient means connecting said tools and their adjacent iris members, and means for moving said tools relatively toward and away from each other.

16. In a machine for applying clip blanks substantially U-shaped in cross section to flexible casing portions to be closed, means for feeding clip blanks, cooperating forming tools positioned on opposite sides of the path of feed of said blanks for shaping said blanks and forcing the closed side thereof about said casing portions, actuating means for moving said cooperating forming tools relatively toward and away from each other, a shaping member movable into and out of operative position in the path of one of said tools and adjacent the closed side of a blank, a pair of cooperating iris members having diverging jaw portions arranged adjacent said tools and relatively movable toward and away from each other, for gathering the flexible material adjacent the casing portion to receive a clip, at least one of said iris members normally extending inwardly toward the other beyond the inner end of the adjacent tool, and means tending to relatively move said iris members with said tools.

17. In a machine for applying clip blanks substantially U-shaped in cross section to flexible casing portions to be closed, means for feeding clip blanks, cooperating forming tools positioned on opposite sides of the path of feed of said blanks for shaping said blanks and forcing the closed side thereof about said casing portions, actuating means for moving said cooperating forming tools relatively toward and away from each other, a shaping member movable into and out of operative position in the path of one of said tools and adjacent the closed side of a blank, a pair of cooperating iris members having diverging jaw portions arranged adjacent said tools and relatively movable toward and away from each other for gathering the flexible material adjacent the casing portion to receive a clip, at least one of said iris members normally extending inwardly toward the other beyond the inner end of the adjacent tools, means tending to relatively move said iris members with said tools, and control means for synchronizing said actuating means to move one of said tools toward said shaping member when the latter is in operative position to initially shape a blank, reverse said tool and thereafter when said shaping member is in inoperative position, relatively move said tools and iris members together.

References Cited in the file of this patent

UNITED STATES PATENTS

| Number | Name | Date |
|---|---|---|
| 407,708 | Weaver | July 23, 1889 |
| 526,080 | Lefeber | Sept. 18, 1894 |
| 557,378 | Gill | Mar. 31, 1896 |
| 1,407,977 | Ziler | Feb. 28, 1922 |
| 1,493,075 | Hirschhorn | May 6, 1924 |
| 1,673,683 | Ingram | June 12, 1928 |
| 1,836,497 | Phelps | Dec. 15, 1931 |
| 1,869,116 | Rambold | July 26, 1932 |
| 1,939,631 | Randall | Dec. 12, 1933 |
| 2,051,097 | McCohey | Aug. 18, 1936 |
| 2,099,624 | Robarge | Nov. 16, 1937 |
| 2,130,779 | Smith | Sept. 20, 1938 |
| 2,202,905 | Goodstein | June 4, 1940 |
| 2,265,277 | Gerke | Dec. 9, 1941 |
| 2,694,198 | Frank | Nov. 16, 1954 |
| 2,709,255 | Frank | May 31, 1955 |